(12) United States Patent
Gozney (10) Patent No.: US 11,464,233 B2
(45) Date of Patent: Oct. 11, 2022

(54) HOUSING FOR MASONRY OVEN CORE, AND MASONRY OVEN INCLUDING SUCH A HOUSING

(71) Applicant: Gozney Group Ltd, Christchurch Dorset (GB)

(72) Inventor: Thomas Robert Llewelyn Gozney, Dorset (GB)

(73) Assignee: GOZNEY GROUP LTD, Christchurch Dorset (GB)

( * ) Notice: Subject to any disclaimer, the term of this patent is extended or adjusted under 35 U.S.C. 154(b) by 0 days.

(21) Appl. No.: 17/045,421

(22) PCT Filed: Apr. 8, 2019

(86) PCT No.: PCT/GB2019/051023
§ 371 (c)(1),
(2) Date: Oct. 5, 2020

(87) PCT Pub. No.: WO2019/193371
PCT Pub. Date: Oct. 10, 2019

(65) Prior Publication Data
US 2021/0153508 A1  May 27, 2021

(30) Foreign Application Priority Data

Apr. 6, 2018 (GB) .................................. 1805784

(51) Int. Cl.
*A21B 1/04* (2006.01)
*A21B 1/33* (2006.01)
(Continued)

(52) U.S. Cl.
CPC ............... *A21B 1/04* (2013.01); *A21B 1/33* (2013.01); *A21B 3/13* (2013.01); *A47J 37/0658* (2013.01); *F24C 15/34* (2013.01)

(58) Field of Classification Search
CPC ............... A47J 37/0658; A47J 37/0704; A47J 37/0759; A21B 1/04; A21B 1/33;
(Continued)

(56) References Cited

U.S. PATENT DOCUMENTS

| 4,108,138 A | 8/1978 | Petin et al. |
| 5,315,922 A * | 5/1994 | Keller ............ A47J 36/06 126/273 R |

(Continued)

FOREIGN PATENT DOCUMENTS

| AU | 2005205830 A1 | 3/2007 |
| FR | 2737286 A1 | 1/1997 |

OTHER PUBLICATIONS

"IP17045421ProQuestSearch-20220503.pdf", ProQuest search, May 3, 2022.*

(Continued)

*Primary Examiner* — Steven B McAllister
*Assistant Examiner* — Daniel E. Namay
(74) *Attorney, Agent, or Firm* — Gesmer Updegrove LLP (57) ABSTRACT

A housing for a masonry oven core comprises at least two shaped sections, capable of being attached together to form a shape that encompasses a masonry oven core. They are at least partly formed from mesh material capable of being rendered with mortar. The completed housing is substantially semi-spherical, and the wall sections extend substantially vertically.

11 Claims, 8 Drawing Sheets

(51) Int. Cl.
*A21B 3/13* (2006.01)
*A47J 37/06* (2006.01)
*F24C 15/34* (2006.01)

(58) Field of Classification Search
CPC . A21B 1/13; F24C 15/34; F24C 15/30; F24B 1/197; F24B 1/04
USPC .................. 126/12, 8, 273 R, 1 R, 30, 19 R
See application file for complete search history.

(56) References Cited

U.S. PATENT DOCUMENTS

| | | | |
|---|---|---|---|
| 9,718,220 B1 | 8/2017 | Huggins | |
| 10,823,425 B2* | 11/2020 | Tseng | A21B 1/02 |
| 10,920,988 B2* | 2/2021 | Tseng | A21B 1/28 |
| 10,920,989 B2* | 2/2021 | Tseng | F24C 3/042 |
| 2002/0153003 A1* | 10/2002 | Huang | F24B 1/205 |
| | | | 126/604 |
| 2014/0224239 A1* | 8/2014 | Pieri | A21B 1/33 |
| | | | 126/21 R |
| 2017/0245506 A1 | 8/2017 | Huggins | |
| 2019/0195500 A1* | 6/2019 | Tseng | F24C 3/025 |
| 2019/0195501 A1* | 6/2019 | Tseng | F24C 3/082 |
| 2019/0195502 A1* | 6/2019 | Tseng | A21B 1/28 |
| 2019/0195506 A1* | 6/2019 | Tseng | F24C 3/122 |
| 2020/0054167 A1* | 2/2020 | Formisano | A47J 37/0623 |

OTHER PUBLICATIONS

International Preliminary Report on Patentability issued by the International Bureau of WIPO in related International Application No. PCT/GB2019/051023 dated Oct. 6, 2020, 9 pages.

International Search Report and Written Opinion issued by the International Searching Authority, the European Patent Office, for International Application No. PCT/GB2019/051023, dated Jul. 19, 2019, 14 pages.

* cited by examiner

HOUSING FOR MASONRY OVEN CORE, AND MASONRY OVEN INCLUDING SUCH A HOUSING

CROSS-REFERENCE TO RELATED APPLICATIONS

The present application is a U.S. National Stage filing under 35 U.S.C. § 371(c) of International Application No. PCT/GB/2019/051023, filed Apr. 8, 2019, which claims priority to Great Britain Patent Application No. 1805784.4, filed Apr. 6, 2018, the disclosures of which are hereby incorporated by reference in their entireties.

BACKGROUND

The present invention relates to pizza ovens, and similar ovens sometimes known as masonry ovens.

A known conventional pizza oven comprises a precast base (which may be provided in sections), on which a precast dome is placed. In order to ensure that heat is retained in the oven, and the sides of the dome do not become dangerously hot during use, insulation is placed around the dome, and a layer of mortar or render applied over the insulation layer.

A common method of applying the insulation is to cover the dome with sheets of rockwool, trimming shape of the rockwool so that it is applied over the whole dome in an even thickness. As the rockwool is applied, sheets of chicken wire are wrapped around the over to hold the rockwool in position, the chicken wire sheets being similarly trimmed to shape and then secured together. When the dome is evenly covered in rockwool, and the rockwool is completely constrained in position by the chicken wire, the mortar render may be applied. The mortar render permanently holds the insulation in place, and protects the insulation.

Applying the insulation and chicken wire is time-consuming. Also, it is difficult for a novice to apply the insulation and chicken wire in a regular and even fashion. This makes applying the render evenly difficult, so the finished oven can be misshapen and irregular.

SUMMARY

The object of the present invention is to allow a pizza oven or similar masonry type oven to be insulated and rendered in a convenient manner.

According to the present invention, there is provided a housing for a masonry oven core according to claim 1.

BRIEF DESCRIPTION OF THE DRAWINGS

The invention will now be described, by way of example, with reference to the drawings, of which

DETAILED DESCRIPTION

Figure 1:
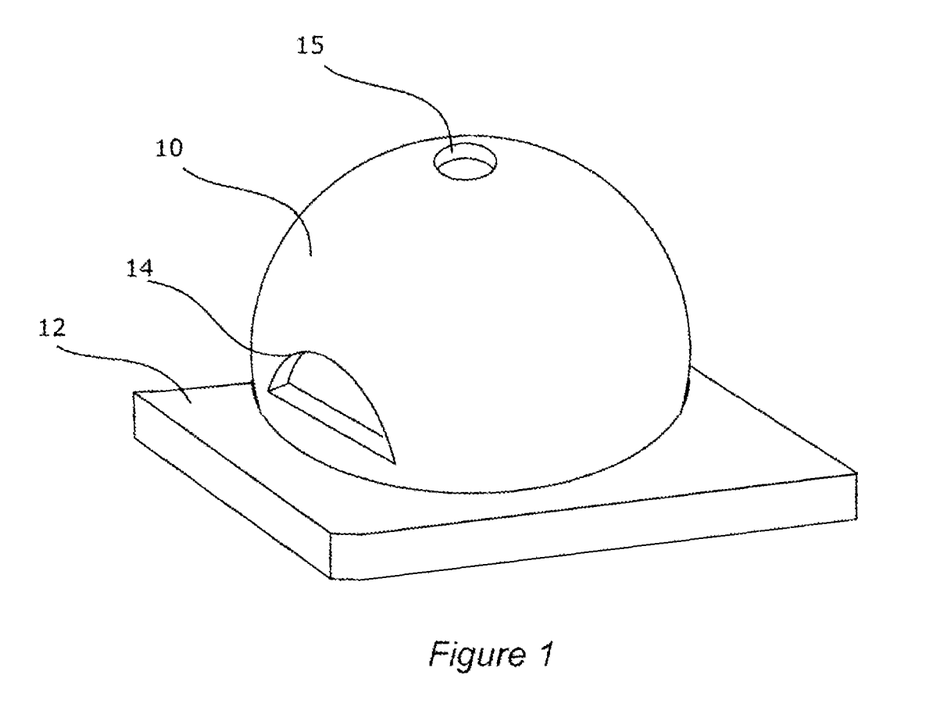
FIG. 1 is a diagrammatic representation of an oven core.

Referring to FIG. 1, a known oven core 10 is supplied pre-moulded, and is placed on a pre-moulded base 12, which may include a notch (not shown) to accept and locate the wall of the oven core. The oven core includes a front opening 14 which allows access to the oven, which may in the form of a tunnel extending from the opening (not shown). The core 10 also includes an upper opening 15 which allows smoke and fumes to escape the oven.

Figure 2:
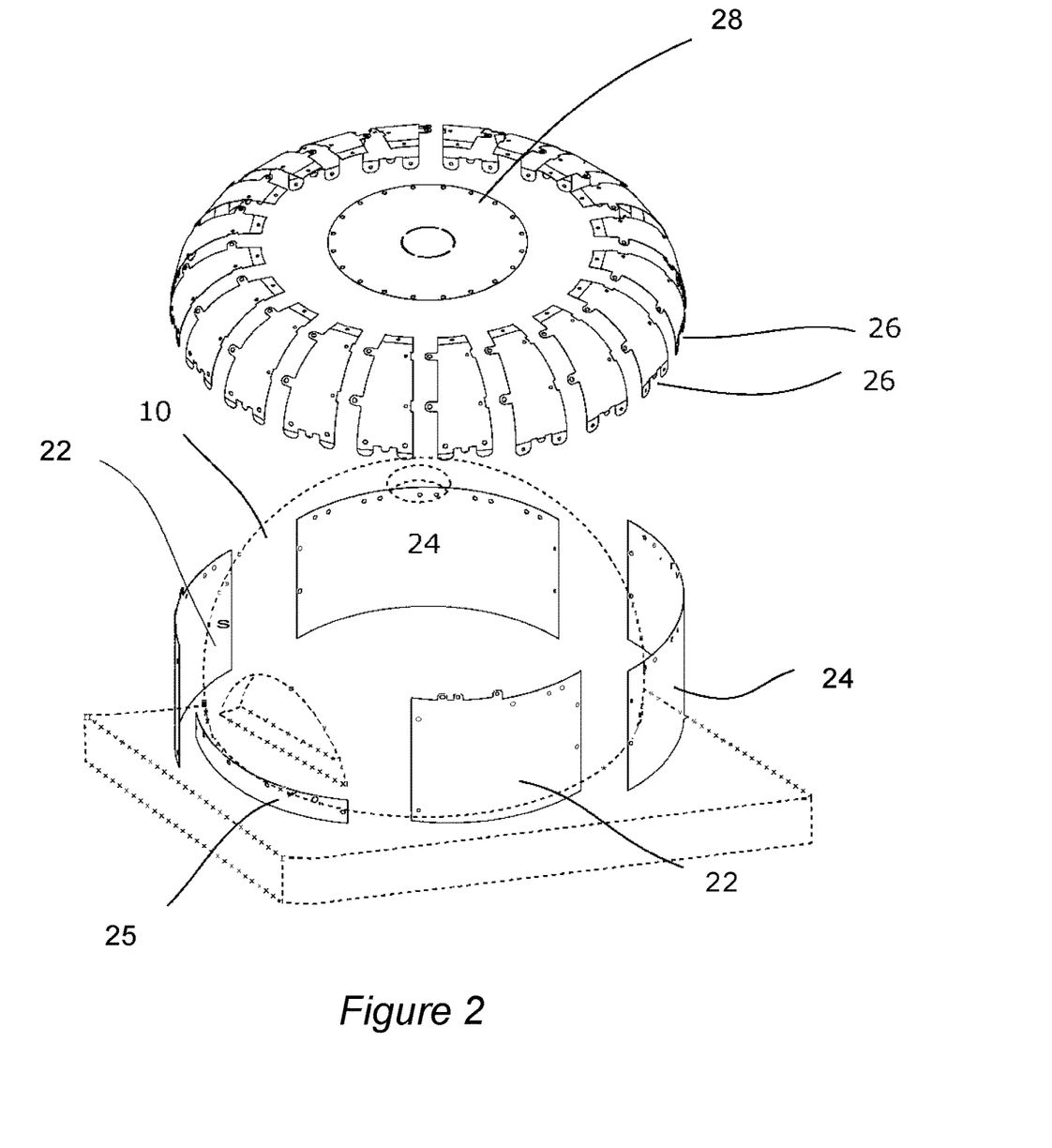
FIG. 2 is an exploded perspective view of an embodiment of the mesh assembly oven core housing (with the oven housing shown in ghosted lines)

Referring to FIG. 2, a mesh assembly 20 comprises two front wall sections 22, two rear wall sections 24, a centre wall section 25, a number of roof segments 26 and a top cap 28.

Figure 3:
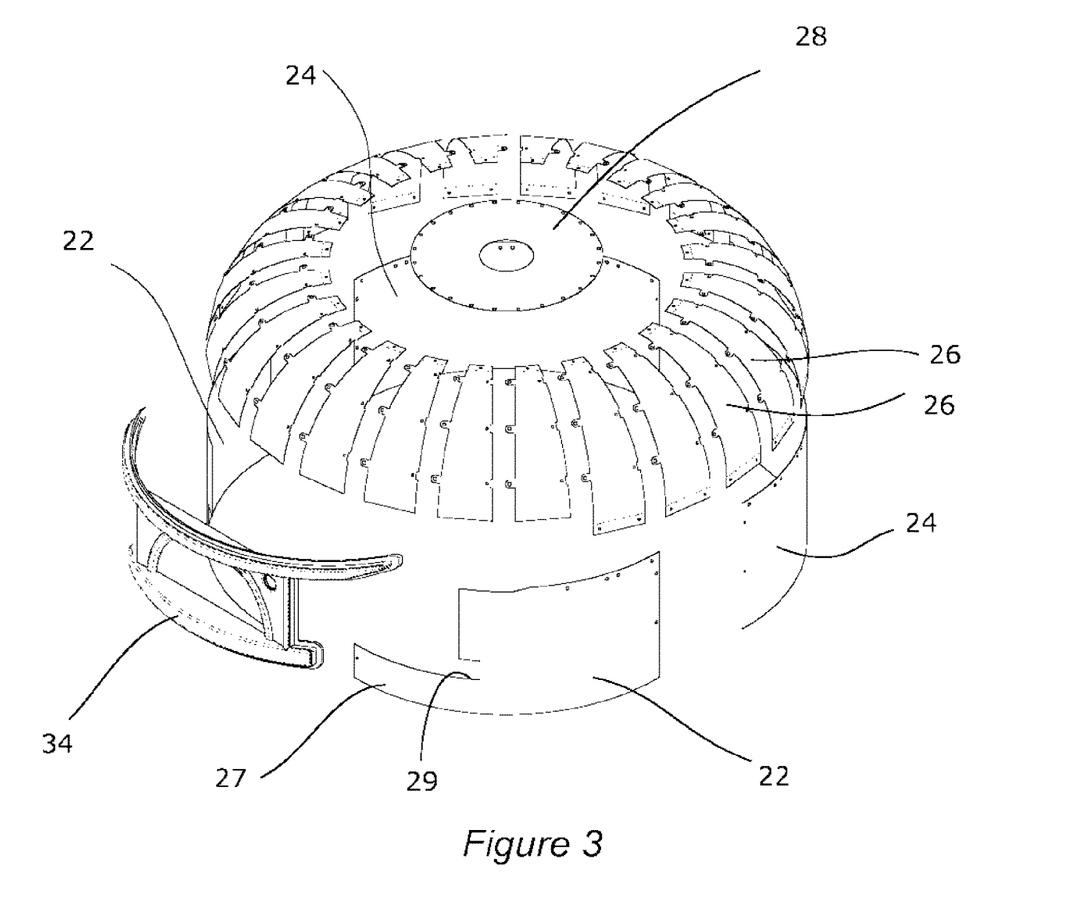
FIG. 3 is an exploded perspective view of another embodiment of the mesh assembly oven core housing.

Referring also to FIG. 3, these sections may be arranged around the core 10 of the oven to enclose it.

Referring to FIG. 3, in an alternative embodiment, as in the case of the embodiment shown in FIG. 2 there is also included two front wall sections 22, two rear wall sections 24, a number of roof segments 26 and a top cap 28; it will be noticed however that there is no centre wall section 25, rather the front wall sections 22 each include extended portions 27 and a recess 29. The principle of construction is the same however, and both embodiments will be used to explain the construction.

Figure 4:
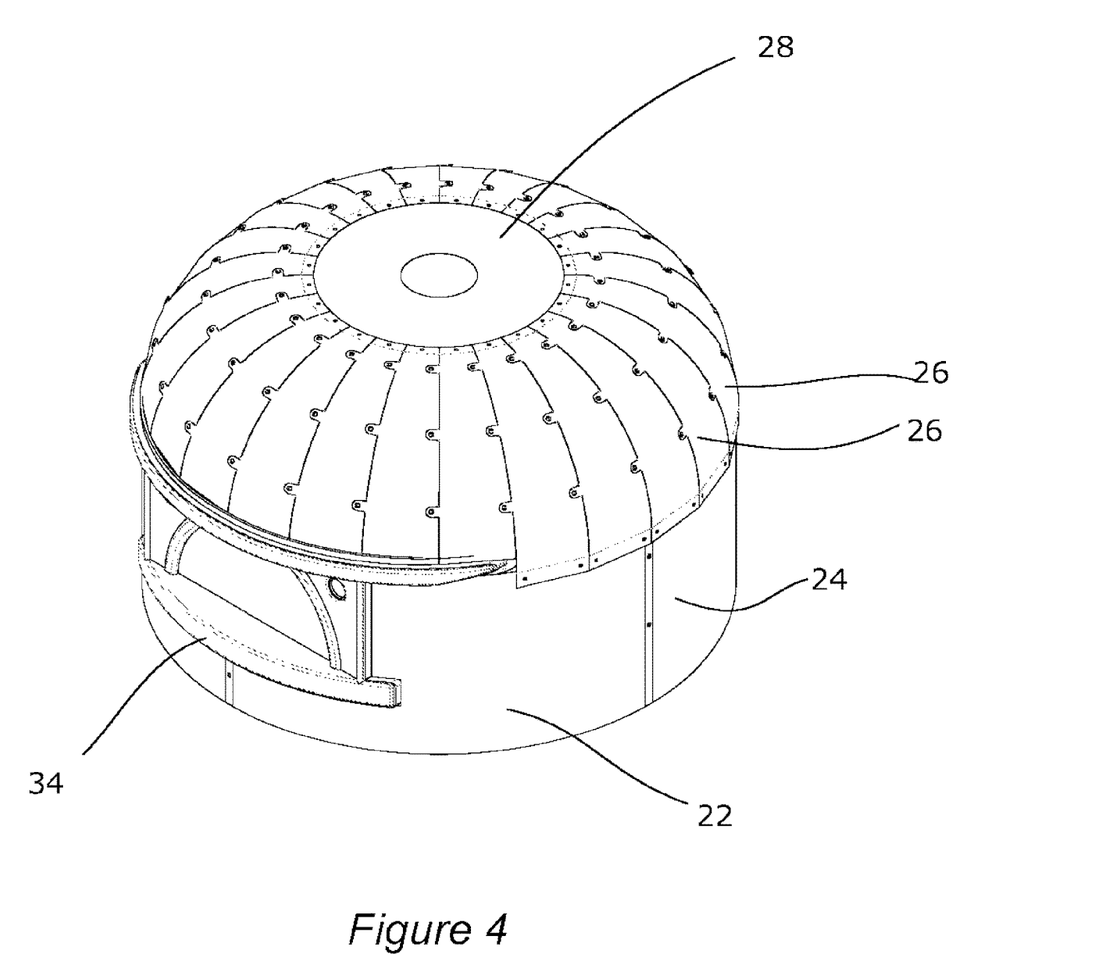
FIG. 4 is a perspective view of mesh assembly oven core housing.

Referring to FIGS. 2 to 4, the front wall sections 22 and rear wall sections 24 and are generally rectangular, though curved along their long axis. The centre wall section 25 (or the extended portions 27) is also a curved rectangle, though is it relatively narrow in height. The length and curvature of these sections is such that when placed end to end on the base 12 of the oven surrounding the core 10 in the arrangement shown in FIG. 4, they encompass the core 10. Each section includes several securement holes 32 distributed on their edges, so that when the sections are arranged to slightly overlap, securement holes 32 on adjacent sections coincide. The sections are secured together using these holes, for example using cable ties threaded through the holes and tightened, or rivets, or some other known fixing means. The height of the centre wall section 25 (or the extended portions 27) ensures that the front opening 14 of the core 10 is unimpeded. As shown in FIGS. 3 and 4, a door surround 34 may be accommodated by the mesh assembly over the extended portions 27 and the recesses 29, and secured to the front wall sections 22.

Figure 5:
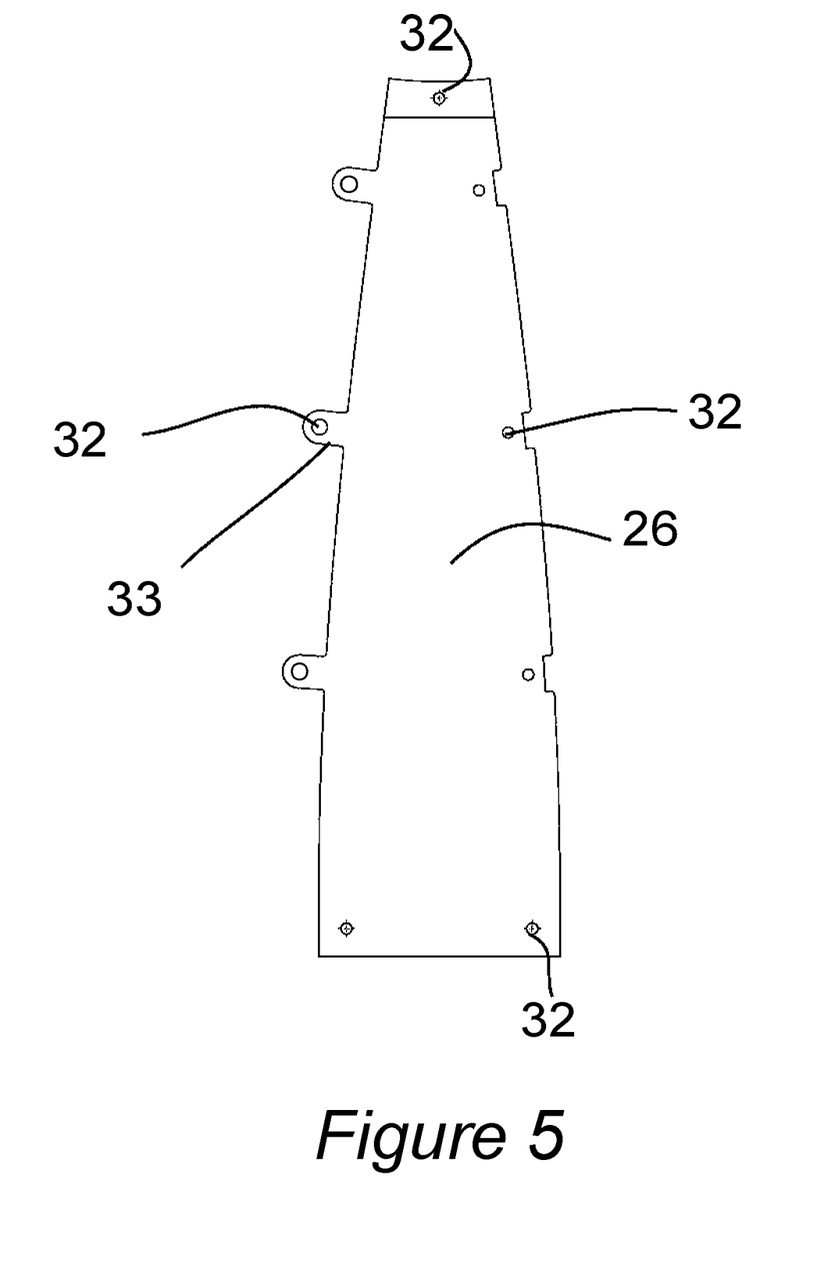
FIG. 5 is a side elevation of a section of the mesh assembly oven core housing.

Referring to FIG. 5, the roof segments 26 are generally trapezoid, tapering slightly to the upper end, and curved along the long axis. The long edges may be slightly curved or bowed as shown. Referring back to FIGS. 2 to 4, the roof segment 26 are arranged side-by-side around the upper edge of the front wall sections 22 and rear wall sections 24, so that they form a curved dome above the oven core 10. FIG. 5 shows securement holes 32 along the top and bottom edge of the roof segment 26; it also shows securement holes along the long edges, with the securement holes 32 on one side being borne on lugs 33. These lugs 33 allow securement holes 32 of adjacent sections to coincide, without the sections themselves having to overlap along their entire length of each section's edge; instead, the section may be abutting edge-to-edge, with the lugs extending over the neighbouring section. The sections are then secured together using the securement holes 32 as previously described.

When the roof segments 26 are arranged together in this manner and secured together, a circular hole remains at the top of the mesh assembly. This is covered by the top cap 28 may be secure, which is a planar circular section, which also features securement holes 32 around its circumference, and may be laid on top of the roof segment 26 (though equally it could be arranged underneath before all the roof segments 26 are arranged). The top cap 28 includes a central aperture 31 (which may be pre-formed, or could be delineated by excised cutaway portions for the person assembling the mesh assembly to remove part of the material from the top cap 28). This aperture allows a flue or chimney to be connected to the upper opening 15 of the core 10 and to extend upwards.

Referring to FIG. 4, when the front wall sections 22, rear wall sections 24, door surround 34, roof segments 26, and top cap 28 are arranged and secured together in this way, they form a complete outer housing for the oven core 10.

Figure 6:
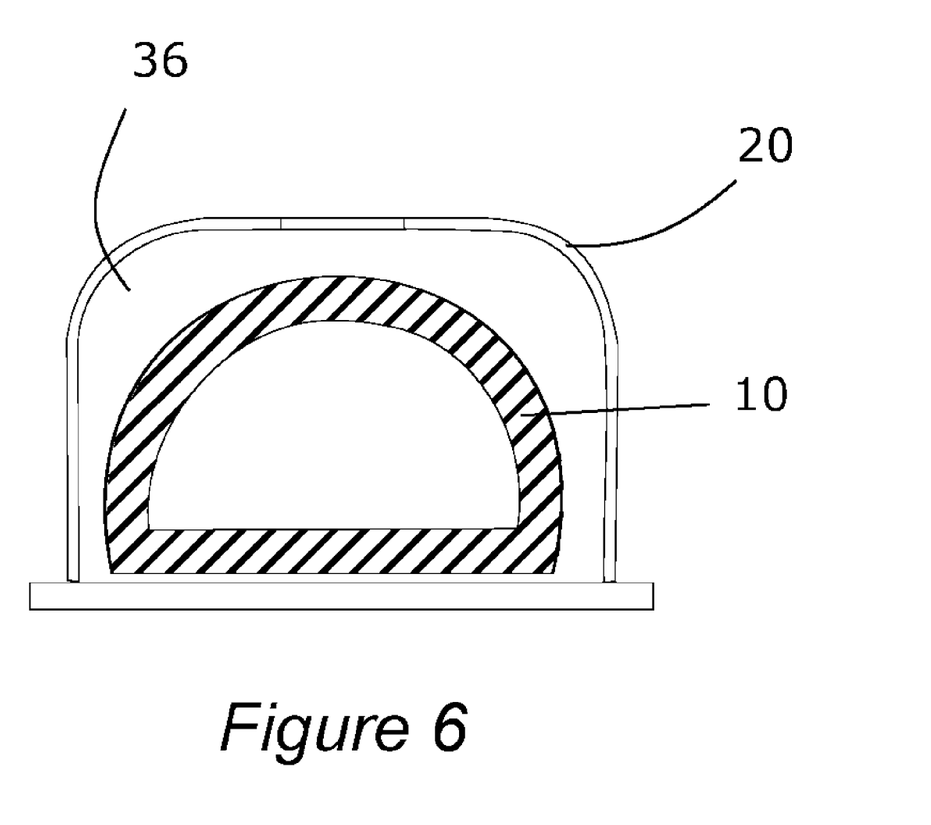
FIG. 6 is a diagrammatic sectional view of the mesh assembly oven core housing and oven core.
Figure 7:
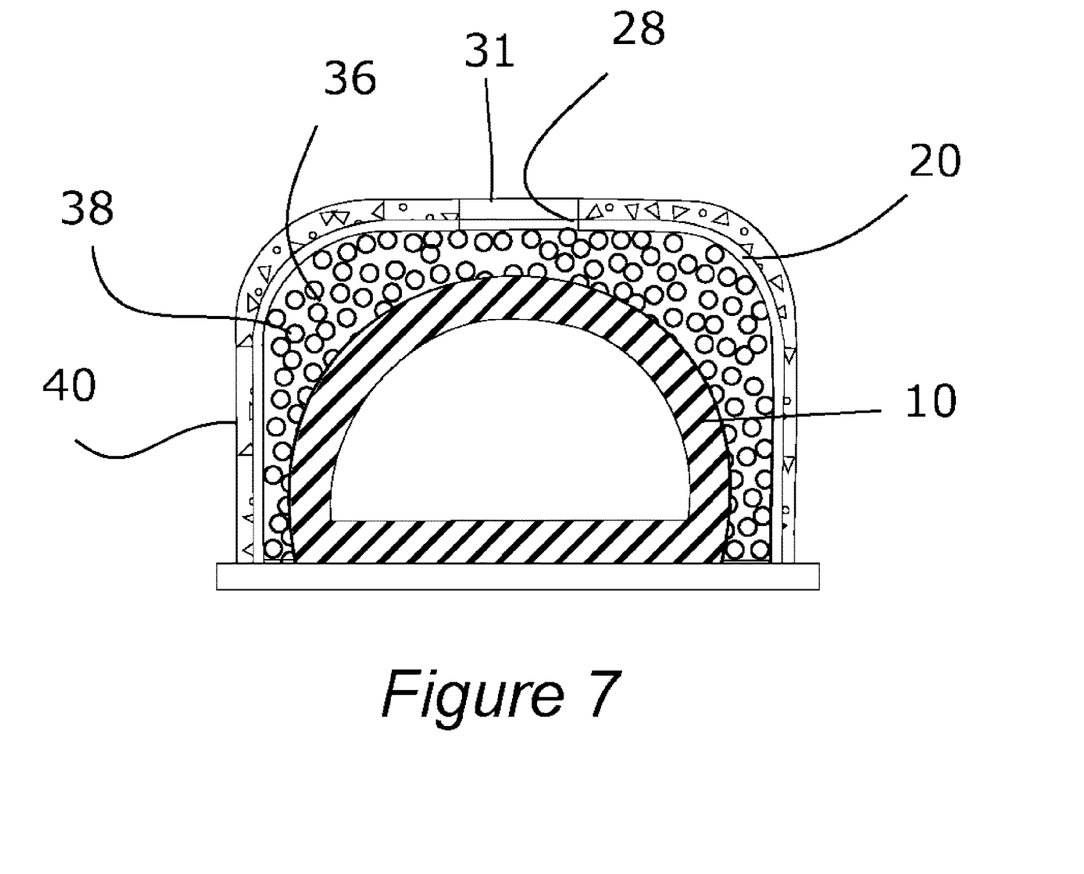
FIG. 7 is a diagrammatic sectional view of the mesh assembly oven core housing and oven core at a further stage of assembly.

Referring to FIG. 6, the inner surface of the completed mesh assembly 20 is spaced from the outer surface of the oven core 10 by a generally regular distance, to form a void 36. Referring to FIG. 7, granular insulating material 38 can be poured into the void 36 through the aperture 31 in the top cap 28 (or this step may be carried out before the top cap 28 is fitted). The granular insulating material 38 flows through the void to complete occupy it. Thus the core 10 has a layer of insulation around its surface. The granular insulating material 38 is chosen to be resistant to high temperature.

Figure 8:
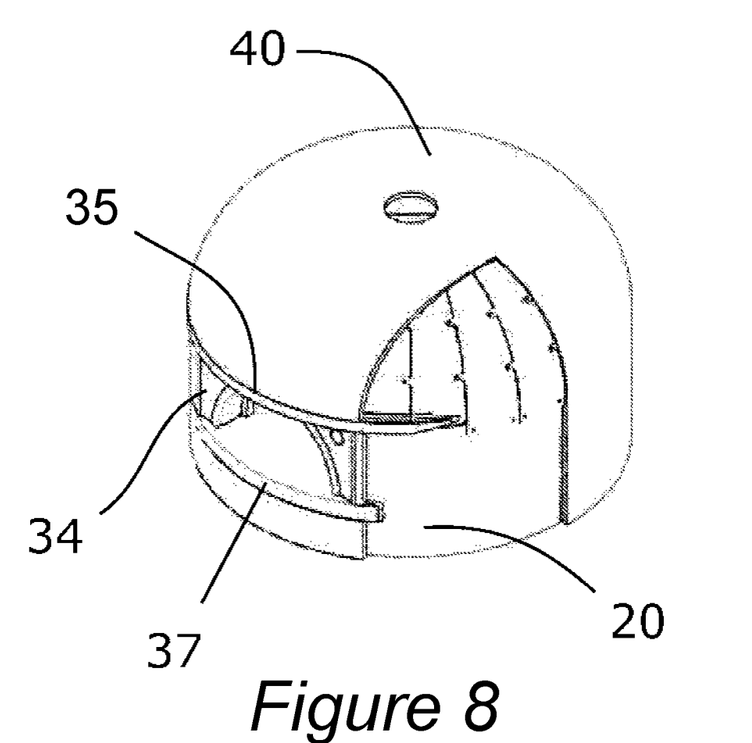
FIG. 8 is a perspective view of the mesh assembly oven core housing and oven core at a further stage of assembly.

The front wall sections 22, rear wall sections 24, door surround 34, roof segments 26, and top cap 28 are completely or substantially formed from a metallic mesh material. This mesh reduces the weight of the mesh assembly 20, and also provides a texture that allows mortar to key to it. Referring to FIGS. 7 and 8, once the granular insulating material 38 has been poured into the mesh assembly 20, and any chimney or flue has been added, a layer of mortar 40 is applied to the mesh assembly 20 to provide an attractive finish, and to protect the mesh assembly 20 and oven core 10 from the environment. The door surround 34 includes an upper ledge 35 and a lower ledge 37, which are curved in a similar manner to the front wall sections 22 and rear wall sections 24, but which protrude from the circumference defined by the assembled mesh assembly 20. The render may be applied around the door surround 34 so that the render surface is flush with these ledges 35, 37 and this the depth of render 40 for the oven as a whole may be gauged from the distance between the outer extent of the ledge 35, 37 and the surface of the mesh assembly 20 around the door surround 34. Other protrusions may be included in the design of the mesh assembly 20 so that the installer has an indication or guide for the depth of mortar render 40 to be applied.

By providing pre-formed sections of the appropriate shapes, an oven core 10 can be provided with an outer covering framework quickly and without practice and with minimal skill. The void in which insulation is to be added can be designed so that a regular and appropriate thickness around the core 10 is achieved, so that the oven functions efficiently. Similarly the completed mesh assembly 20 provides a convenient and properly-shaped and textured surface for the installer to apply a render coat of mortar to the outside of the oven. This saves time for installation, and allows installers without previous experience to complete a pizza or masonry oven and achieve good results.

By designing the shape, configuration and sections of the mesh assembly 20 with a particular oven core 10 in mind, good results can be achieved for any oven core. It will be readily apparent that the shape of the completed mesh assembly 20 can be varied to accommodate different oven core shapes, or to achieve different shapes of the final rendered oven. The mesh assembly 20 could accordingly be cylindrical, or polygonal rather than the semi-circular or semi-disco-rectangular or flattened semi-disco-rectangular shape described and illustrated herein.

It will also be appreciated that the sections of the mesh assembly 20 may be varied, so that more or fewer sections are provided. For example, the front wall section 22 and rear wall section 24 could include parts which form the domed roof sections, so that separate roof segments 26 are not needed.

Although the use of granular insulating material 38 has been described, the mesh assembly 20 could be used with convention rockwool, another insulating material, or left empty.

Sections mesh assembly 20 may be shaped so that various apertures are provided in the completed mesh assembly 20 so that the oven can be supplied with different services.

Although the sections described herein are described herein as being secured together using coincident holes, alternative clips, snap-fit mechanisms or other means of securing sections could be provided.

The housing could be supplied in a partly or fully assembled stated, or even formed in a single piece, sixed and shaped to fit over an oven core.

The invention claimed is:

1. A housing for a masonry oven core, comprising:
   at least two shaped sections, capable of being attached together to form a shape configured to encompass a masonry oven core,
   wherein the sections are at least partly formed from mesh material capable of being rendered with mortar, and
   each section includes a plurality of securement holes distributed on their edges, so that when the sections are arranged to partially overlap, securement holes on adjacent sections coincide so as to be secured together by fixing elements extending through the coinciding securement holes of the adjacent sections.

2. The housing according to claim 1, wherein the shape of the completed housing is substantially semi-spherical.

3. The housing according to claim 1, wherein the sections comprise wall sections that extend substantially vertically.

4. The housing according to claim 1 wherein the sections comprise roof sections, which are curved so that they form a dome section.

5. The housing according to claim 1, wherein the sections comprise lugs and the securement holes are provided on the lugs.

6. The housing according to claim 1, wherein there is provided an edge that protrudes from a surface of the completed housing, which indicates a depth of mortar to be applied.

7. The housing according to claim 6, wherein said edge is provided by a door surround.

8. A masonry oven including a housing according to claim 1 and further comprising an oven core, wherein the shaped sections are pre-formed in shape such that, when the sections are secured together, the completed housing is of a size and shape that the distance between the outer surface of the core and the inner surface of the housing is substantially constant without having to deform the shaped sections.

9. A method of constructing a masonry oven comprising the steps of placing a housing according to claim 1 around and/or upon an oven core.

10. The method according to claim 9, wherein granular insulating material is poured between the housing and the oven core.

11. The method according to claim 9, wherein mortar is applied to the housing.

* * * * *